United States Patent [19]
Koski

[11] 3,867,688
[45] Feb. 18, 1975

[54] ELECTRODELESS CONDUCTANCE MEASUREMENT DEVICE

[75] Inventor: Oscar H. Koski, Richland, Wash.

[73] Assignee: The United States of America as represented by the United States Atomic Energy Commission, Washington, D.C.

[22] Filed: Dec. 18, 1973

[21] Appl. No.: 425,919

[52] U.S. Cl. ............................................. 324/30 A
[51] Int. Cl. ............................................ G01n 27/42
[58] Field of Search ................................. 324/30 A

[56] References Cited
UNITED STATES PATENTS

| | | | |
|---|---|---|---|
| 3,404,335 | 10/1968 | Kidder | 324/30 |
| 3,404,336 | 10/1968 | Rosenthal | 324/30 |
| 3,588,692 | 6/1971 | Koski | 324/60 R |

Primary Examiner—Alfred E. Smith
Assistant Examiner—Rolf Hille
Attorney, Agent, or Firm—John A. Horan; Arthur A. Churm; Paul A. Gottlieb

[57] ABSTRACT

A device is provided for electrodeless measurement of the conductance of a material. A damped oscillatory signal is applied to the primary winding of a first transformer ring core. A current loop, including as part of its path the material and carrying a current in response to a signal of the primary winding, couples the first core to a second transformer ring core by acting as a secondary winding for the first core and as a primary winding for the second core. The peak current in a secondary winding of the second core due to and corresponding to the current in the loop and the peak voltage across the loop, which is constant for all materials at the instant the damped oscillatory signal is applied to the primary winding, gives the conductance of the loop.

4 Claims, 2 Drawing Figures

PATENTED FEB 18 1975 3,867,688

ELECTRODELESS CONDUCTANCE MEASUREMENT DEVICE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The development of process instrumentation for application to nuclear separation processes requires the selection of instrument structural material and instrument design which offer long maintenance-free service. Changes in the electrical and magnetic properties of exposed structural instrument elements due to high temperature and radiation exposure over the lifetime of an instrument results in the risk of unreliable accuracy in prior art devices. Over the lifetime of most such devices, continual recalibration and readjustment of operating parameters is required to compensate for the anticipated changes in device properties.

In particular, measurement of conductivity of a fluid is desirable in many areas such as monitoring nuclear separation processes. Prior art devices have relied on the response of the fluid to induced magnetic fields to measure its conductivity electrodelessly with an electromagnetic device. However, under the severe radiation environment and high temperatures of many processes, the magnetic and electrical properties of the magnetic field inducing means and the response sensing means varies over the lifetime of the device and adjustment in frequency and amplitude of the field inducing means and continual monitoring of the sensing means response is required.

U.S. Pat. No. 3,588,692 disclosed a device for determining an unknown capacitance by charging the subject capacitor and then discharging it in series with the primary winding of a transformer. The peak current in the secondary winding of the transformer was an indicia of the unknown capacitance. It was observed that regardless of changes in the magnetic properties of the elements of the device and regardless of the inherent resistance of the loop, the voltage across the loop including the subject capacitor and the primary winding, at the instant the capacitor began to discharge, was constant. The present disclosure relates to an electrodeless conductivity measuring device which utilizes this concept.

It therefore is an object of this invention to provide an electrodeless conductivity measurement device.

Another object of this invention is to provide an electrodeless conductivity measuring device operable in a high temperature, high radiation environment relatively immune to changes in its own magnetic properties over a long lifetime.

SUMMARY OF THE INVENTION

Noncontact measurement of the conductance of a material is obtained by charging a capacitor in series with the primary winding of a first transformer ring core. The capacitor is periodically discharged so that across the primary winding is produced a damped oscillatory signal due to the capacitor, the inductance of the winding and inherent resistivity. A loop including for at least a portion of its path the material, acts as a one-turn secondary winding for the first ring core and as a one-turn primary winding for a second transformer ring core. At the instant the discharge is initiated, a constant voltage appears across by loop regardless of the resistance of the loop so that by measuring the peak current in a secondary winding of the second core, which will appear at the initiation of discharge and which corresponds to the current in the loop at the initiation of the discharge, the conductance of the material can be determined with Ohm's law.

DETAILED DESCRIPTION OF THE PREFERRED EMBODIMENT

Figure 1:
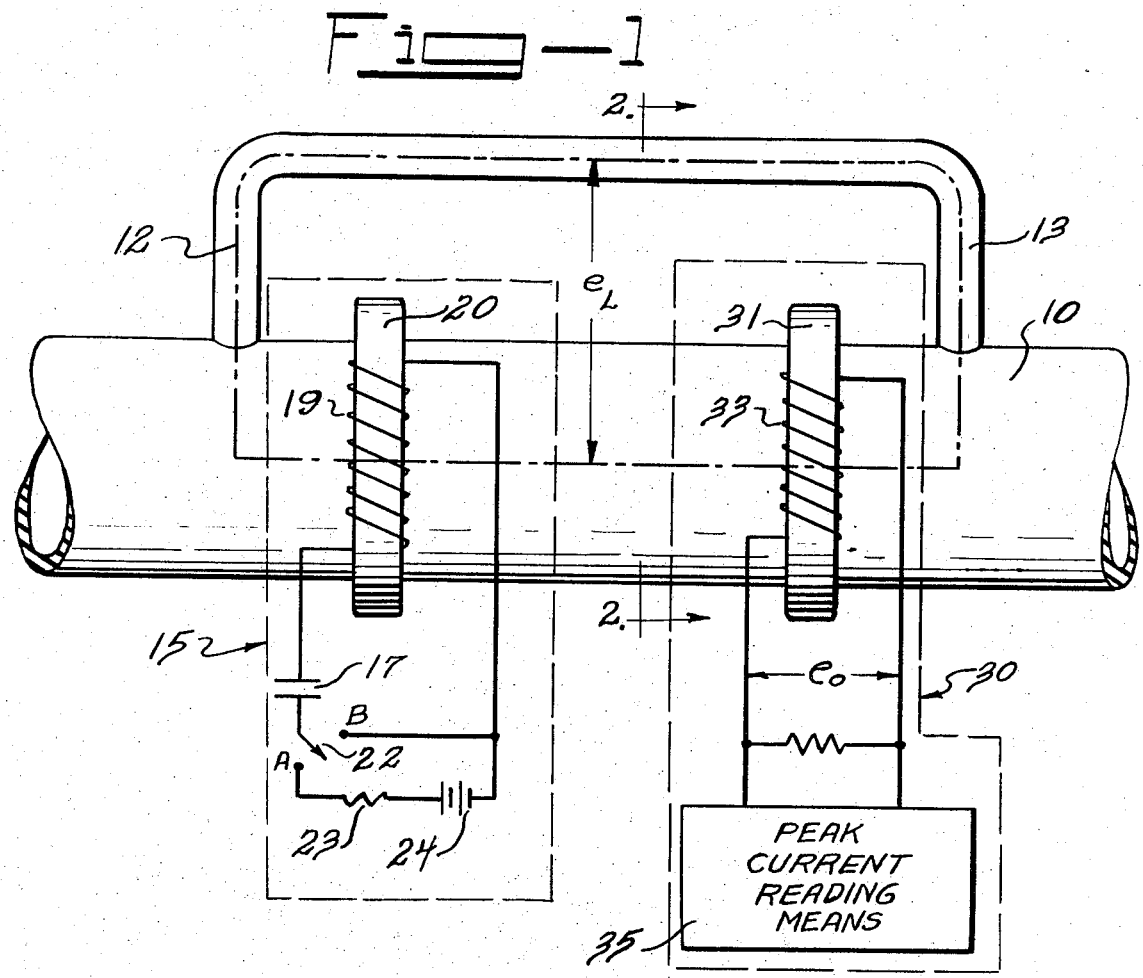
FIG. 1 is a schematic of the electrodeless conductivity measurement device.
Figure 2:
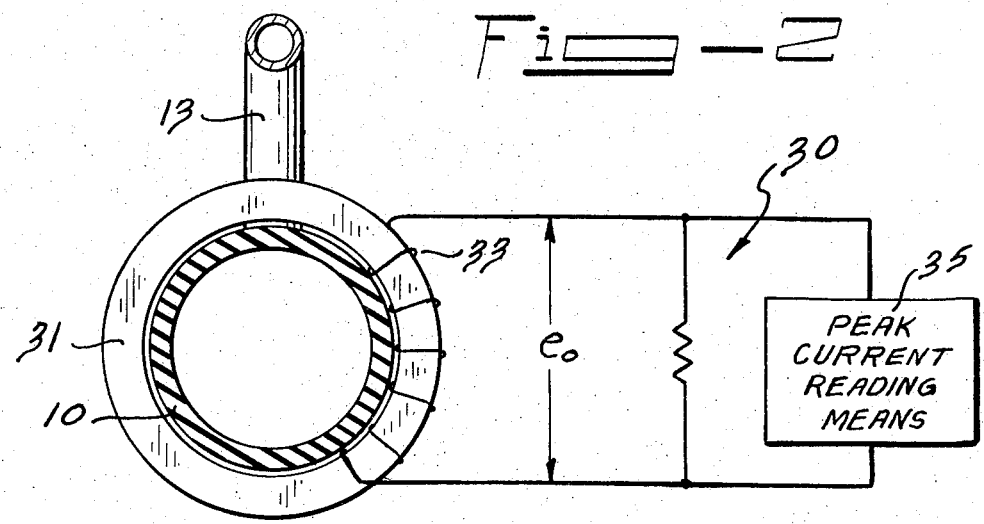
FIG. 2 is a sectional view along line 2—2 of FIG. 1.

Referring to FIG. 1 and FIG. 2, there is shown a device for electrodelessly measuring the conductivity of a subject material. For example, the material may be a fluid contained in a suitable conduit 10. Conduit 10 is preferably of a nonconducting material to prevent unnecessary added current path material in coupling loop 12 so that only known elements support current flow in the manner to be described. Conduit 10 may include a stationary or a flowing fluid. A conductive bypass 13 either in the form of a metallic strap or a return conduit containing the subject fluid, as shown in FIG. 1, is provided so that the combination of the fluid in conduit 10 and the bypass 13 forms a current loop generally following about the dotted line 12 about which current may flow due to a magnetic field across a portion of the loop.

Such a current in loop 12 is induced by driver element 15. Driver 15 includes a capacitor 17 coupled in series to primary winding 19 wrapped about transformer ring core 20. Switch 22 has two positions A and B. In position A, capacitor 17 is coupled via resistor 23 to battery 24 which will charge capacitor 17. In position B, a short circuit path is provided for capacitor 17 in series with primary winding 19. Due to the series combination of capacitor 17 and primary winding 19, which functions as an inductor, and the inherent resistance of the short circuited circuit, an RLC damped oscillator circuit is developed. As capacitor 17 discharges, a damped oscillatory output is developed through primary winding 19 inducing a corresponding current to flow in loop 12.

The current loop 12 is made to pass through the hole in ring core 20 such as by inserting conduit 10 through ring core 20 similar to that for core 31, as shown in FIG. 2. Thus current loop 12 acts as a one-turn secondary winding for winding 19. In response to current flowing in core 20, a voltage $e_L$ appears across loop 12 and a corresponding current is induced to flow about current loop 12 which is sensed by sensor 30.

Sensor 30 includes a transformer ring core 31 through which current loop 12 is made to pass such as by inserting conduit 10 through the hole in ring core 31, as shown in FIG. 2. Transformer core 31 has wrapped around it a secondary winding 33. In response to current flowing in current loop 12, a corresponding change in magnetic flux is induced in core 31 and thereby inducing a current in secondary winding 33, giving an output $e_0$ across secondary winding 33 corresponding to the current in secondary winding 33.

To operate the device as an electrodeless conductivity measuring device, switch 22 is first in position A so that capacitor 17 charges. Then at time $s = 0$, switch 22 is moved to position B to create the RLC circuit described and the damped oscillatory voltage appears across primary winding 19 inducing a damped oscillatory current to flow about current loop 12. Due to the damping of the signal, the peak value of this current occurs almost instantly after time $= 0$. The current in loop 12, which acts as a primary winding for core 31, induces a damped oscillatory current in secondary winding 33 whose peak value occurs at the same time or almost the same time as when $e_L$ is at peak voltage after time $= 0$.

It has been observed that for a given capacitor 17, given number of turns of primary winding 19 and given charge on capacitor 17, at the instant of switching from position A to position B, time $= 0$, a voltage $e_L$ is induced across current loop 12. The peak value, which occurs at the instant after time $= 0$, over a large range of resistance values is constant regardless of changes in the magnetic properties of the elements of the device as a result of radiation or temperature effects. This constancy appears to persist to at least 1000 ohms where complex impedance begins to appear. Note that as the signal persists the voltage of current loop 12 becomes sensitive to other circuit parameters so that by insuring that maximum peak current occurs at time $= 0$ these effects are negated. It is apparent, then, that if the peak voltage of current loop 12 is constant at time $= 0$, then the current induced through sensing element will depend upon the resistance value of current loop 12, assuming negligible capacitive and inductive components.

Analysis has shown that the peak value of the voltage $e_L$, occurring at the instant after the switch 22 is moved to position B, is equal in magnitude to the voltage $e_I$ on capacitor 17 divided by the number of turns of the primary winding 19. By sensing the magnitude of the peak current $i_P$ in the secondary winding 33 and knowing the peak voltage $e_L$ in current loop 12 after time $= 0$, from the capacitance and the charging time, the conductance G is obtained from Ohm's law, i.e, $G = i_P/e_L(n_S)$, where $n_S$ is the number of turns of the secondary winding of the second core. Knowing the dimensions of the current loop and correcting for any portion of the loop, such as bypass 13, which may not composed of the subject material, the conductivity may be obtained. Conductivity is determined by the quantity of electricity transferred across a unit area, per unit potential gradient per unit time and is the reciprocal of resistivity.

Sensing element 30 includes means 35 for sensing the maximum current induced in secondary winding 33 by current flowing in current loop 12. Such means might be as disclosed in U.S. Pat. No. 3,588,692 and, in particular, the circuit shown in FIG. 3 of that patent.

The value of circuit elements is determined by engineering considerations apparent to those skilled in the art. For example, the value of the capacitor is related to the frequency of oscillation desired. A typical value might be 0.05 uf capacitance for capacitor 17. It appears that any conductor may be tested and values as low as 0.01 ohm have been observed. For use in nuclear separation processes, fluids such as a nitric acid have been monitored with the invention.

The peak current read by sensor 30 and the known peak voltage $e_L$ are useful for numerous purposes. For example, they can be used to detect changes in the percentage of solids in a solution, corrosion, angular displacement of current loop 12, pressure, fluid flow and high speed thermometry.

The embodiments of the invention in which an exclusive property or privilege is claimed are defined as follows:

1. A device for inducing a peak voltage across and a peak current in a material so that the conductance G of the material may be determined, comprising: a first transformer ring core having a primary winding of n turns thereabout, means for applying at time $= 0$ a first damped oscillatory voltage of peak value $e_I$ across said primary winding of said first core, said peak value $e_I$ occurring the instant after time $= 0$, a current loop including the material for at least a portion of said current loop, said current loop being positioned to pass through said first core, thereby acting as a secondary winding for said first core so that in response to said first damped oscillatory voltage a first damped oscillatory current is induced in said current loop and a second damped oscillatory voltage appears across said current loop of peak value $e_L = e_I/n$, said peak value $e_L$ occurring the instant after time $= 0$, a second transformer ring core having a secondary winding thereabout, said current loop being positioned to pass through said second core, thereby acting as a primary winding for said second core so that in response to said first damped oscillatory current in said current looped a second damped oscillatory current of peak value $i_P$ is induced in said secondary winding of said second core, and means for measuring $i_P$ coupled to said secondary winding of said second core, with the conductance of said material being $G = i_P/e_L$.

2. The device of claim 1 wherein said means for applying a damped oscillatory voltage includes a capacitor, a switch having two positions, and a voltage supply, with said switch in a first position said voltage supply being coupled in series with said capacitor and said primary winding of said first core thereby charging said capacitor, with said switch in a second position said capacitor being coupled in series with said primary winding of said first core to allow discharge of said capacitor so that a damped oscillatory voltage appears across said primary winding of said first core due to the RLC circuit effected by the series coupling of said capacitor and said primary winding of said first core and the inherent resistance thereof.

3. The device of claim 2 wherein said current loop includes a conduit and the material is in the form of a fluid contained in said conduit.

4. The device of claim 3 wherein said fluid contained in said conduit is a solution including nitric acid.

* * * * *